US007617014B1

(12) United States Patent
Rangan et al.

(10) Patent No.: US 7,617,014 B1
(45) Date of Patent: Nov. 10, 2009

(54) MANAGING AND UNIFYING STRUCTURED REPRESENTATIONS OF PRODUCT INFORMATION

(75) Inventors: Ravi Mangalam Rangan, Bothell, WA (US); William Zabriskie, Redmond, WA (US); Bruce R. Winegarden, Issaquah, WA (US); Franz Amador, Seattle, WA (US); Eric Kennedy Herman, Seattle, WA (US)

(73) Assignee: Centric Software, Inc., Campbell, CA (US)

( * ) Notice: Subject to any disclaimer, the term of this patent is extended or adjusted under 35 U.S.C. 154(b) by 365 days.

(21) Appl. No.: 11/142,164

(22) Filed: May 31, 2005

Related U.S. Application Data

(60) Provisional application No. 60/575,652, filed on May 28, 2004.

(51) Int. Cl.
*G06F 19/00* (2006.01)

(52) U.S. Cl. .............................. 700/97; 707/4; 705/54

(58) Field of Classification Search .................. 700/90, 700/3, 97; 707/3, 4, 101; 705/51–54, 67, 705/26, 40
See application file for complete search history.

(56) References Cited

U.S. PATENT DOCUMENTS

| 6,922,684 B1* | 7/2005 | Aldridge et al. ............... 706/60 |
| 6,938,021 B2* | 8/2005 | Shear et al. .................. 705/67 |
| 7,133,867 B2* | 11/2006 | Irle et al. ....................... 707/4 |
| 7,249,067 B2* | 7/2007 | Doerksen et al. ............. 705/27 |
| 2006/0026011 A1* | 2/2006 | Verego et al. .................. 705/1 |
| 2006/0031110 A1* | 2/2006 | Benbassat et al. ............. 705/9 |
| 2006/0235794 A1* | 10/2006 | Albazz et al. ................ 705/40 |

\* cited by examiner

*Primary Examiner*—Kidest Bahta
(74) *Attorney, Agent, or Firm*—Beyer Law Group LLP

(57) ABSTRACT

Aspects of the subject matter described herein relate to defining, sharing, unifying, and managing multiple structured representations of product information in the context of business activities. In certain aspects a data structure is provided that enables, among other things, unambiguous specification of subelements. In other aspects, a method is provided which may be used to, among other things, unambiguously specify subelements. Other aspects are described in the specification.

19 Claims, 8 Drawing Sheets

MANAGING AND UNIFYING STRUCTURED REPRESENTATIONS OF PRODUCT INFORMATION

CROSS-REFERENCE TO RELATED APPLICATION

This application claims the benefit of U.S. Provisional Application No. 60/575,652, filed May 28, 2004, entitled METHOD AND SYSTEM FOR MANAGING AND UNIFYING STRUCTURED REPRESENTATIONS OF PRODUCT INFORMATION, which application is incorporated herein in its entirety.

BACKGROUND

The widespread availability of computers and software applications has given organizations a powerful tool with which to create and access information. Within one organization, product information may be structured by different groups such as marketing, sales, accounting, management, maintenance, manufacturing, engineering, research, procurement, quality, analysis, and other branches of the organization, based on their unique information perspectives. Product development organizations are challenged with unifying information from these multiple perspectives while reusing common information, variations within these perspectives, and associated change revisions. What is needed, then, is a way to easily define, share, reuse, unify, and manage structured product information while accommodating the unique representational and process needs of different groups engaged in product lifecycle and business activities. Ideally, the way would provide an easy mechanism to reuse items as well as relationships, while maintaining configuration consistency, information integrity, maximizing reuse, accommodating variability, and ensuring process autonomy.

SUMMARY

Briefly, aspects of the subject matter described herein relate to defining, sharing, unifying, and managing multiple structured representations of product information in the context of business activities. A flexible and adaptable configuration management approach to establish and maintain a hierarchically structured item configuration that accommodates item and relationship reusability and multiple co-existing specification perspectives is needed to streamline processes that rely on precise item information. Defining a configuration that is able to pick and choose from these multiple perspectives, for a given item context, in an easy-to-use manner, allows the company to maintain configuration consistency and integrity while maximizing reuse and also accommodates variability while ensuring process autonomy. Aspects of the subject matter described herein provide an adaptable and controlling mechanism for precisely specifying product configuration commitments against reusable items and relationships while handling variability due to options, departmental/disciplinary perspectives, change revisions, and the like.

Based on the product lifecycle phase, different types of items may be of interest such as part definition items during detailed design, processes during manufacturing planning, modules, functions, and requirements during system engineering, and serialized part instances during the in-service lifecycle phase. Aspects of the subject matter described herein are applicable to product representations that exhibit and reuse structured hierarchical decompositions and associated reusable information, such as system engineering hierarchy structures, part specifications including bills-of-materials, mappings between hierarchical structures such as the mapping functional models and the resulting behavioral models, and the like.

Aspects of the subject matter described herein are also relevant to the management of product architectures, which are modularity schemes by which functional elements of a product are arranged into physical building blocks made up of parts. Product architectures capture functional breakdowns of the product, modular system decompositions, and mappings between functions and their realizations. Product architectures also facilitate knowledge capture, reuse, and system engineering business processes by integrating multi-disciplinary perspectives and accommodate variability due to options and dependency mappings between requirements and realizations (e.g., requirements to behavior, function to design, design to test, and the like) to enable quality processes. Product architectures enable process independence for the parties involved in contributing to the architecture, while enhancing consistency. Aspects of the subject matter described herein also enable computerized support for product architecture management.

In aspects of the subject matter described herein, precise structured representations of a part in support of different perspectives are consolidated under a common part definition. For example, a part may consolidate the engineering design and the corresponding manufacturing plans whose bills-of-material are represented by hierarchical structures.

In other aspects of the subject matter described herein, product variability such as alternative configurations representing different options, work in progress variations, and the like are unified under a common item definition. This is useful in maintaining product definition over time and enables manufacturing initiatives such as mass customization.

In other aspects of the subject matter described herein, new item configurations may be defined from existing item configurations by making commitments to other configurations within the existing item configuration. For example, a vehicle platform engineer may reuse a vehicle product architecture that includes options for automatic and manual transmissions, noting platform-specific configuration variations (automatic transmission rather than manual transmission), and augment it with platform-specific information to define a new configuration.

In other aspects of the subject matter described herein, users working from a given perspective may evolve and revise their configuration based on their own unique processes, while reusing and co-existing with related dependent configurations from different perspectives. For example, a modular system engineering hierarchical representation that realizes a functional breakdown structure may be revised multiple times to optimize for different modularization strategies while retaining critical functional dependencies with traceability.

In yet other aspects of the subject matter described herein, users may establish traceability statements that define how items from one perspective reference items within another perspective. This may be done by storing relationships between item specifications that indicate how items in one item specification are derived from items in another item specification. For example, the items within the functional decomposition representing the systems design perspective may reference items within the requirements decomposition representing the requirements perspective. Alternatively, parts within the bill of materials in a manufacturing perspective may reference parts within the bill of materials in an engineering perspective. Such referencing may provide information as to how a change may impact various perspectives and how changes may be propagated across items.

Through these clear, concise, and valid configuration definitions, organizations benefit through reduced errors and elimination of non-value-added work, resulting in streamlined processes.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "one or more aspects". Identifying aspects of the subject matter described in the Detailed Description is not intended to identify key or essential features of the claimed subject matter.

Other aspects will become apparent from the following Detailed Description when taken in conjunction with the drawings, in which:

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the subject matter described herein, and it is to be understood that other embodiments can be utilized, and other changes can be made, without departing from the spirit or scope of aspects of the subject matter described herein. The following detailed description is, therefore, not to be read as limiting the scope of the claimed subject matter.

Figure 8:
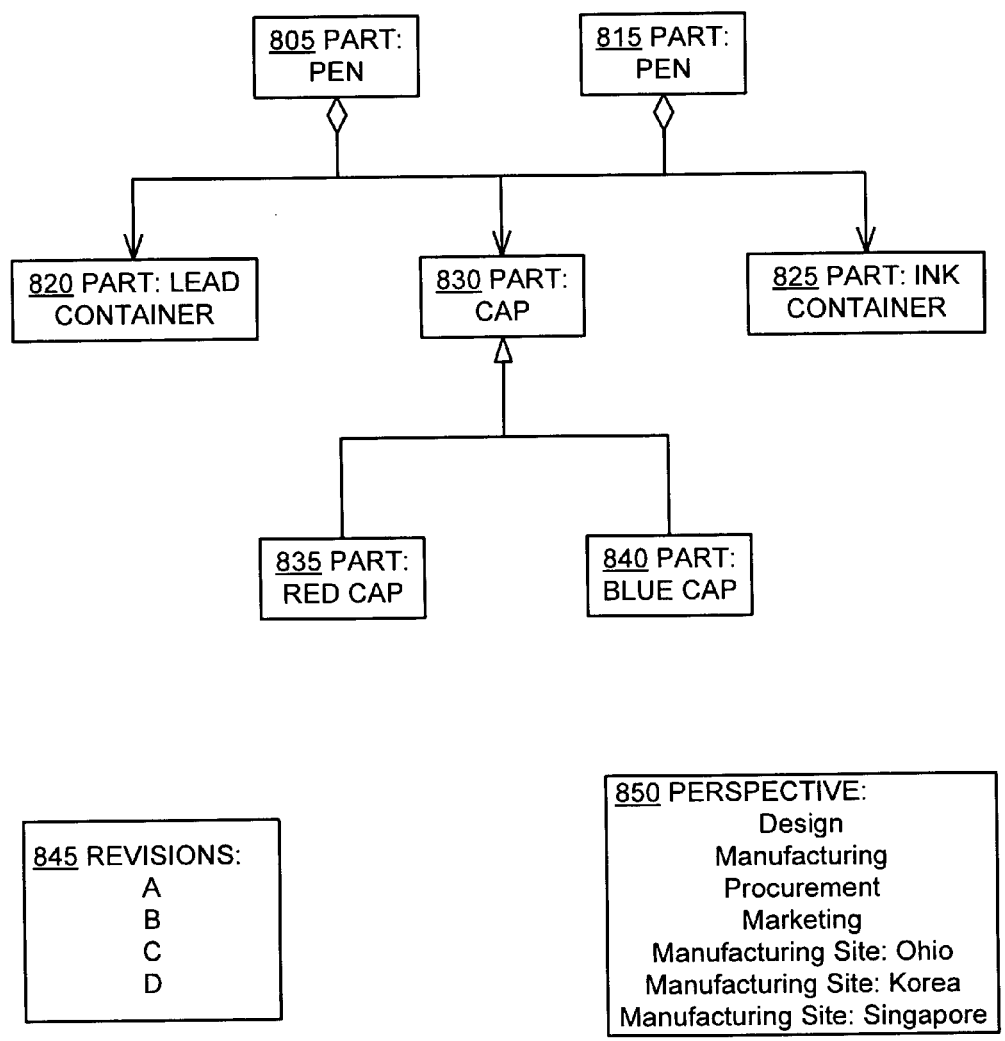
FIG. 8 is a block diagram generally representing an environment to which aspects of the subject matter described herein may be applied.

FIG. 8 is a block diagram generally representing an environment to which aspects of the subject matter described herein may be applied. The environment includes pens 805 and 815, revisions 845, and perspectives 850. In one embodiment, the pen 805 comprises a lead container 820 and a cap 830 while the pen 815 comprises the cap 830 and an ink container 825. Specifications (also referred to as "definitions") may be created to describe the various objects of the environment and may be provided from various perspectives 850. For example, the design specification for the pen may include a bill of material noting the functional component parts of the pen, a geometry model, a material specification, a finish specification, and the like. Typically, the manufacturing specification for the pen complies with the design specification and may augment it with a bill of material reflecting the process plan, process instructions, tool set up instructions, and the like.

A pen may comprise a bill of materials or assembly that includes one or more parts. When a part (e.g., cap 830) is changed in a manner that still complies with the form, fit, and function of that part, a company may indicate that the part has undergone a revision. In some management systems this may be indicated by a revision number of a specification for the part. If the part (e.g., cap 830) may be used with a different pen (e.g., pen 805), a data structure may be created that allows one to query for all pens associated with the part.

Specification variations may serve different intents. An example of a variation is a revision to the original specification to improve the part's performance without violating its form, fit, or function. Another example of a variation is the way the cap 830 is made at different manufacturing sites which may vary even though the design specification may be the same (e.g., because of local suppliers and manufacturing processes). In yet another example the cap 830 may include multiple variations red 835 and blue 840 that use a common specification for the cap.

In addition, the cap 830 may be defined differently based on a perspective. A perspective may comprise a marketing, sales, accounting, management, maintenance, manufacturing, engineering, research, procurement, quality, analysis, and the like perspective. One or more perspectives (e.g., manufacturing) may have variations based on location (e.g., site). For example, the manufacturing definition for a part made within the manufacturing plant at a Korean site may be different from the manufacturing definition for the same part made within the manufacturing plant at an Ohio site. Each perspective and variation thereof may be associated with a different revision (e.g., one of revisions 845). Furthermore, perspectives may change revisions autonomously from each other. For example, the revision of a design perspective for the cap 830 may change independently from a manufacturing perspective for the cap 830 at the same site, and vice versa.

In more complicated assemblies a product may be comprised of parts that are comprised of parts that are comprised of additional parts and so forth. Each part at each level may be associated with different perspectives and revisions. With these various perspectives and revisions, manually determining and tracking the makeup of a part may be very difficult.

Figure 2:
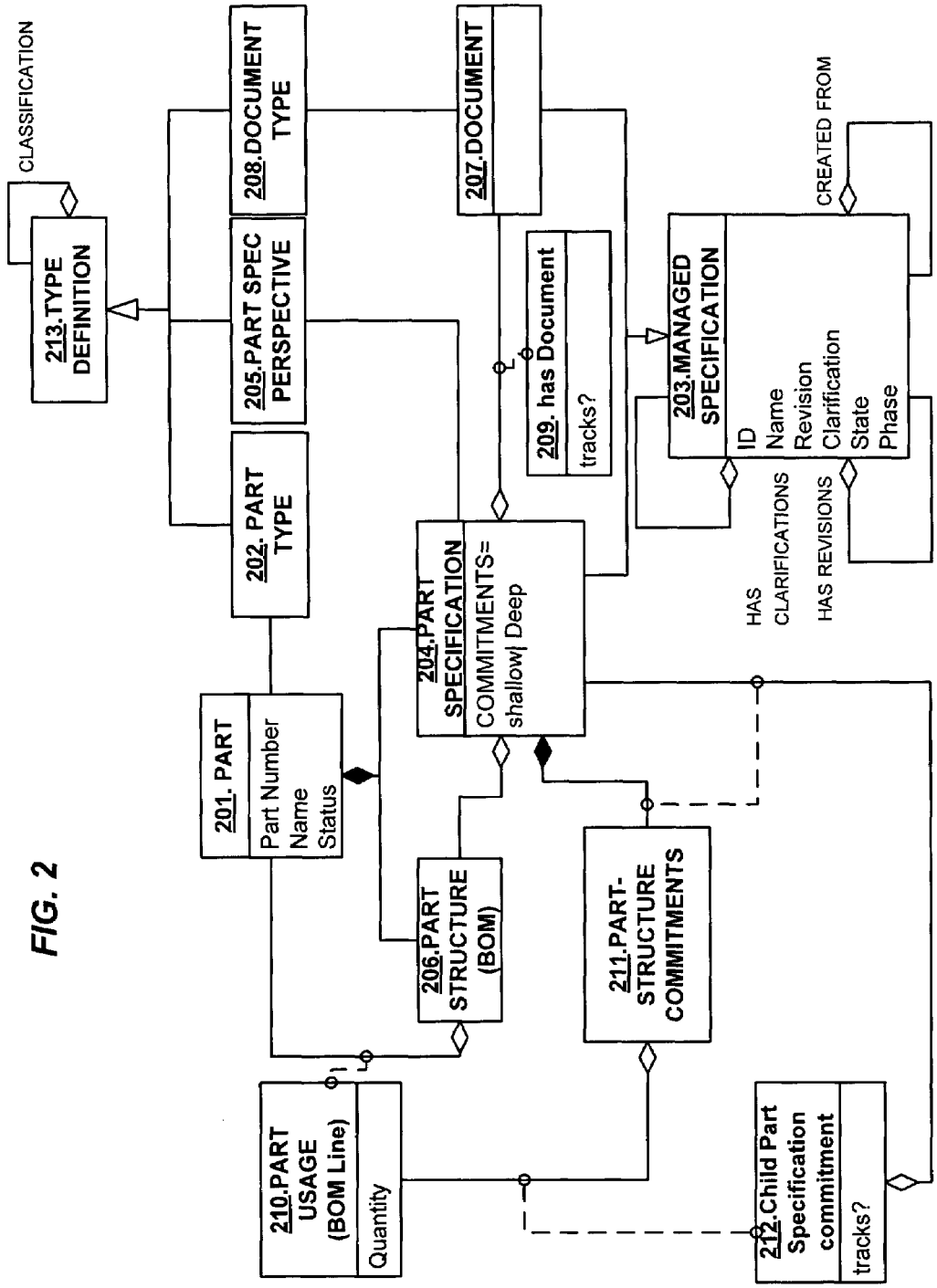
FIG. 2 is a block diagram representing an exemplary application of the UML model of FIG. 1 in accordance with various aspects of the subject matter described herein.

To deal with this complexity, a data structure in accordance with the UML diagram described in conjunction with FIG. 2 may be created to associate a part and its subassembly parts with perspectives and revisions so that the part and its subassembly parts may be unambiguously specified. Associating the part and its subassembly parts with perspectives and revisions is sometimes referred to a making one or more commitments (e.g., one commitment for each part or subassembly part for which one or more specifications exist).

Figure 1:
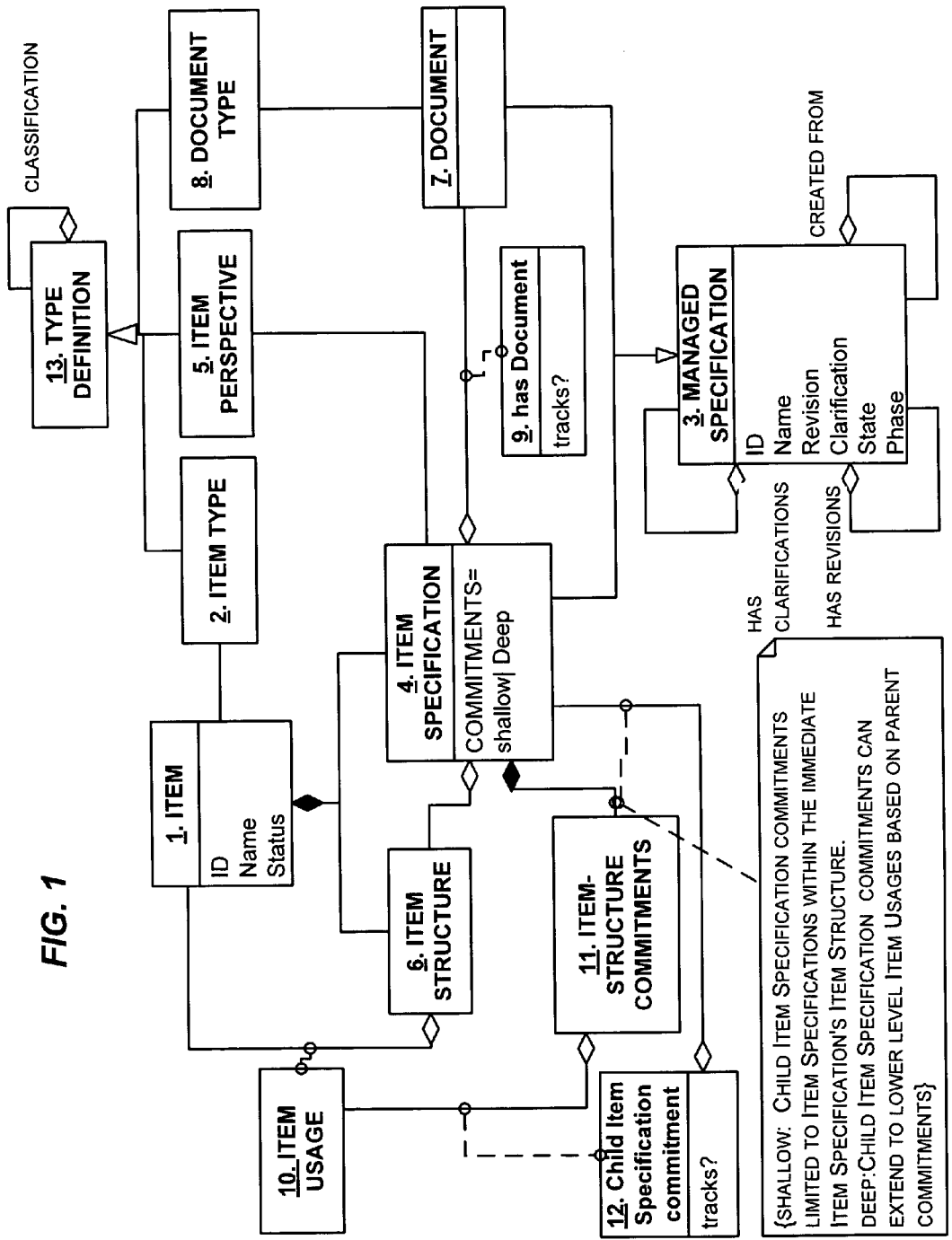
FIG. 1 is block diagram representing an exemplary UML class diagram showing classes and relationships between an item, its taxonomy, and its specification in accordance with aspects of the subject matter described herein.

A similar data structure in accordance with the UML diagram described in conjunction with FIG. 1 may be created to associate an item and its subitems with perspectives and documents so that the item and its subitems may be unambiguously specified.

Figure 6:
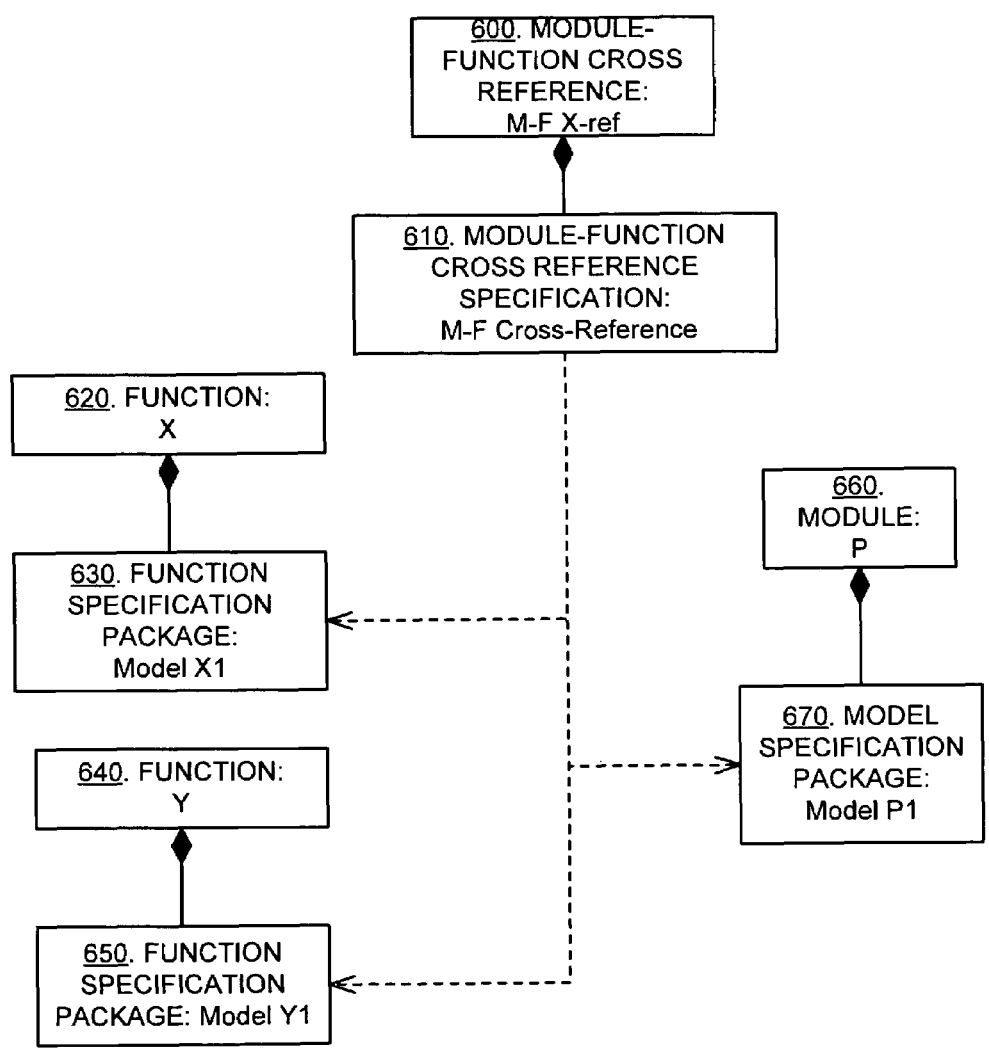
FIG. 6 is a block diagram representing another exemplary application of the UML model of FIG. 1 in accordance with various aspects of the subject matter described herein.

Similarly, a data structure in accordance with the UML diagram described in conjunction with FIG. 6 may be created to unambiguously specify the behavior of a function within a product architecture.

Unified modeling language (UML) class and activity diagrams are used to assist in describing various aspects of the subject matter described herein. UML syntax is described in UML Distilled: A Brief Guide to the Standard Object Modeling Language by Martin Fowler, Addison-Wesley, Boston, Mass., 2004, which is hereby incorporated by reference to the extent that it does not contradict anything herein.

FIG. 1 is a block diagram representing an exemplary UML class diagram showing classes and relationships between an item, its taxonomy, and its specification in accordance with various aspects of the subject matter described herein. An item specification is an aggregation of an item structure and related documents in accordance with various aspects of the subject matter described herein. The item's specification further refines the item structure by identifying for each item within the structure, the corresponding item specification, which is applied recursively through the resulting hierarchy.

An item 1 represents information and a process of a real world or conceptual abstraction that is of importance to a business in the context of executing and planning functions. Such functions may relate to one or more product life phases and may encompass both the information and the process definition. For example, an item 1 may represent a physical element such as a part definition, a sub-assembly, an instance of a given part (also known as a serialized part), and the like. An item 1 may also represent functional elements, logical modules, and the like. An item 1 may be uniquely identified by an identifier and descriptive attributes such as name, status, and the like. An item 1 is classified by its item type 2, which may include a hierarchical classification system. An example of an item 1 is a part having a part number and company name as its unique identifier. An item 1 may have zero, one, or more item structures 6 that define the item 1's decomposition structure. An item 1 may reuse another item by including it within its item structure 6. For example, an item 1 may reuse a part hierarchy such as a bill-of-material, a modular decomposition of a product, and the like. Typically, users are required to follow specific rules relative to defining and changing the item 1's information during business process execution.

A managed specification 3 is a configuration controlled object that is identified by a composite key that may include its identity, revision, clarification, and attributes such as name, state, phase, and the like. Users may be required to follow specific rules relative to creating, accessing, revising, clarifying, and changing information associated with a managed specification 3 during business process execution.

An item 1 may have one or more item specifications (item specs) 4, each of which is uniquely identified within the context of the item 1. An item spec 4 is a type of managed specification 3 and may be classified by an item perspective 5, which establishes a specific vantage point and representation relative to an item 1. For example, a part item may have one or more engineering, manufacturing, and procurement specifications for the corresponding engineering, manufacturing, and procurement perspectives.

An item spec 4 references a reusable item structure 6 and one or more documents 7 related through a document relationship 9. A company may introduce business rules to specify the item types 2, item perspectives 5, and document types 8 that are valid for a specific item spec 4, based on that item spec's item perspective 5 and corresponding item type 2. For example, a "manufacturing" item perspective for an "assembly" item type may only reference "assembly" and "component" item types within its item structure, and "manufacturing", "engineering" or "purchasing" item perspectives, and not "model" item types or "marketing" item perspectives.

A document 7 is a uniquely identified object with metadata and associated contents and is classified by its document type 8. For example, a document 7's associated contents may include a scanned paper document, an electronic file, a record in a database, an information structure that represents information about products, processes, or projects, and the like. The item spec 4 may have a document relationship 9 that relates directly to a specific document revision or to a document 7 based on an applicability policy. The applicability policy is a business rule on document relationship 9 that states how the item spec 4 and the document 7 are related. An example of an applicability policy is a statement that a specific revision of the document 7 relates to the item spec 4; another example is a statement that the latest revision of a document 7 relates to the item spec 4.

The usage of items within the item structure 6 may be qualified by an item usage 10, which may specify attributes such as quantity and the like.

The item spec 4 also defines item-structure commitments 11. These item-structure commitments 11 are relationships to item specs 4 within the items 1 referenced by the item structure 6 associated with the item spec 4 through one or more child item specification commitments 12. Since an item 1 may have several item specs 4 corresponding to different perspectives and revision levels, an item specification commitment establishes a relationship to a specific item specification based on an applicability policy. This applicability policy is a business rule that states how the item-structure commitments 11 refines each item usage 10 with child item specification commitments 12 that state which item spec 4 should be used for the given item usage 10's context. An example of an applicability policy is a statement that a specific revision of the item spec 4 relates to the item-structure commitments 11; another example is a statement that the latest revision of an item spec 4 relates to the item-structure commitments 11. These commitments may be one level (shallow) or many levels (deep).

In the case of shallow (single-level) commitments, the item spec 4 contains item-structure commitments, which further qualifies each item usage 10 referenced by the item spec 4's item structure 6, with a child item specification commitment 12 that references one of the item specs 4 associated with the item 1 referenced by the item usage 10.

In the case of deep (multi-level) commitments, the item spec 4's item-structure commitments 11 qualify each item usage 10 associated with the immediate item spec 4's item structure 6's item usage or item usages 10 associated with an already committed item 1's item spec 4's item structure 6. The qualification is in the form of a child item specification commitment 12 that references one of the item specs 4 associated with the item 1 referenced by the item usage 10.

A child item specification commitment 12 supports an applicability policy that specifies how a system should determine the specific revision of the referenced item spec 4. An example of an applicability policy is to track to the latest item spec 4 at a given state (e.g., in a released state) or resolve to the specific revision of the item spec 4.

Also shown is a generalized type definition classification hierarchy 13 that generalizes the item type 2, the item perspective type 5, and the document type 8.

A system operating in accordance with aspects of the subject matter described herein may use these items, relationships, and business rules to implement a method to establish and maintain a concise and precise configuration definition from one or more perspectives.

The UML model shown in FIG. 1 may be used in conjunction with multiple phases of product development lifecycle such as systems engineering, detail design part definition, and the like. The data structure unifies multiple representations from different perspectives 5 with precise relationships to reusable items (e.g., item structure 6, document relationship 9, item usage 10, item-structure commitments 11, and child item specification commitment 12) under a common item definition (e.g., item 1). The UML model may also be used to consolidate product variability such as alternative configurations and options under a common item 1. Consolidating product variability is particularly useful to implement product families, which is a key element of mass customization. New item configurations may reuse existing item specs 4. Additionally, each item spec 4 may be controlled independently, i.e., it may be created and evolve independently and follow its own, unique, autonomous process. Dependencies between different item specs 4 are maintained through a structure implemented in accordance with the UML model shown in FIG. 1 to ensure data integrity and traceability. This is enabled by the revision control behavior for managed specifications 3.

FIG. 2 is a block diagram representing an exemplary application of the UML model of FIG. 1 in accordance with various aspects of the subject matter described herein. The application may be used, for example, to define and manage part configuration information and may be applied during the detail design stages of product development where the part definition is precisely established and communicated between design and manufacturing and other disciplines. Each discipline may establish its autonomous definition, based on its own perspective. For example, the manufacturing Part Specification may be created from the design Part Specification. Subsequent changes to the design Part Specification may be propagated to the manufacturing Part Specification, while the manufacturing Part Specification is free to evolve autonomously to accommodate manufacturing-specific needs. Flexible Part specification commitments for assembly structures delivers a system and method to define, unify, reuse, and autonomously manage product configurations relative to multiple perspectives, alternative product offerings, and change revisions.

Figure 3:
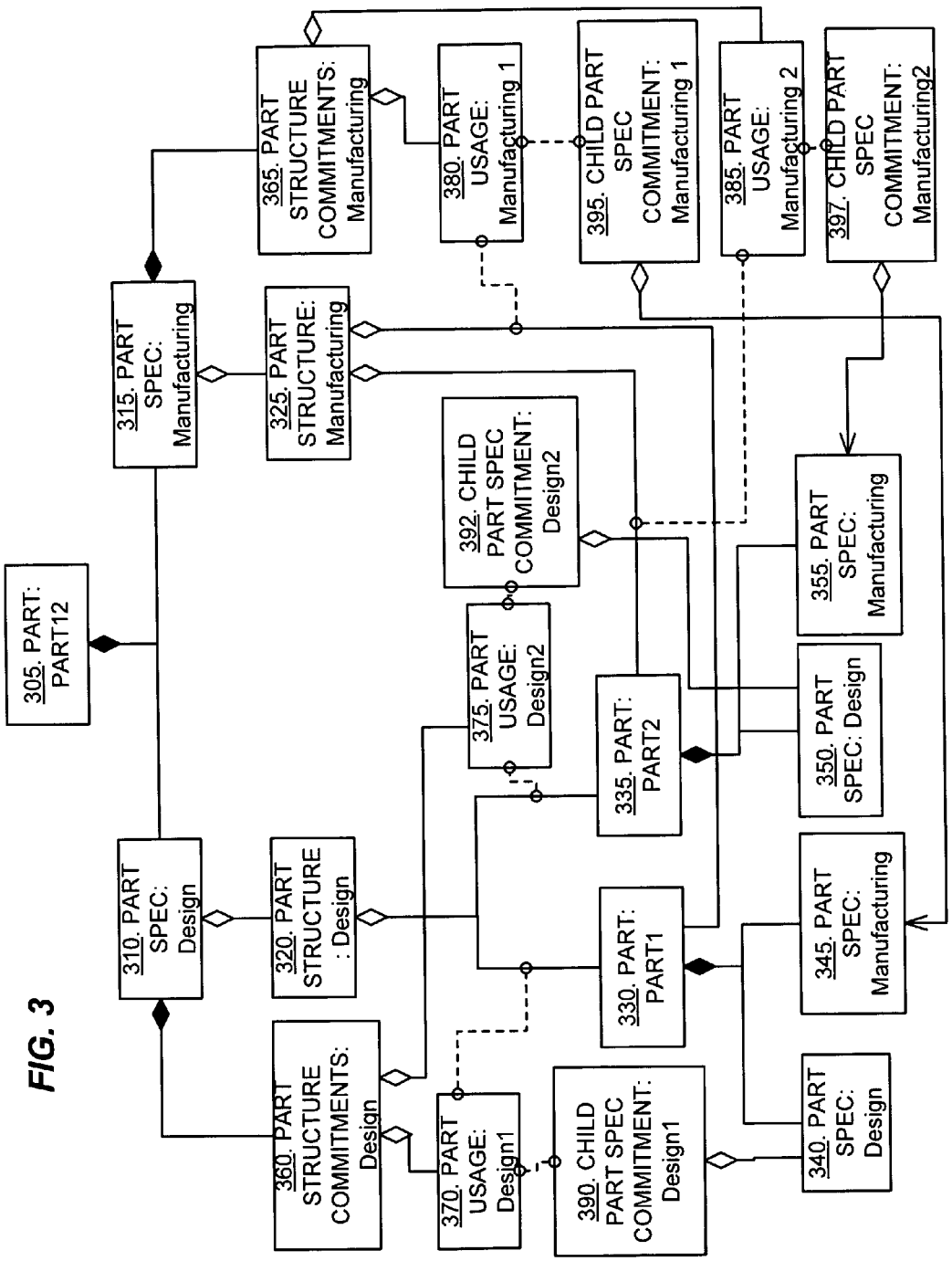
FIG. 3 is block diagram representing an exemplary UML object diagram that shows business objects as a specific instantiation of the class diagram shown in FIG. 2 in accordance with various aspects of the subject matter described herein.

The nomenclature in FIG. 2 introduces classes such as Part 201, Part Specification 204, Part Structure 206, and Part Usage 210, Part Structure Commitments 211, Part Usage 210, Child Part Specification Commitment 212, Document 207, has Document relationship 209, Part Type 202, Part Spec Perspective 205, Document Type 208, Type Definition 213, and Managed Specification 203 and follows the model shown in FIG. 1. An instantiation of this class diagram is shown in FIG. 3, which represents an object diagram. FIG. 3 shows that Part12 305 has two Part Specifications to represent the design and manufacturing perspectives. The Design Part Specification 310 has a Part Structure 320 that uses Part:Part1 330 and Part:Part2 335, each of which has its own Design (340, 350) and Manufacturing (345, 355) Part Specification. Part:Part12's Design Part Specification 310 references Part:Part1 and Part:Part2's Design Part Specifications (340, 350), while Part Part:Part12's Manufacturing Part Specification 315 references Part:Part1's and Part:Part2's Manufacturing Part Specifications (345, 355). Part:Part12 305 references its child Part's Part Specifications (340, 345, 350, 355) through its Design and Manufacturing Part Structure Commitments (360, 365), Design and Manufacturing Part Structure (320, 325), Design and Manufacturing Part Usage (370, 375, 380, 385), Design and Manufacturing Child Part Spec Commitments (390, 392, 395, 397) respectively. Through these clear, concise, and valid configuration definitions, organizations can unify multiple configurations for different groups while retaining group autonomy. This results in reduced errors, elimination of duplicate work, and streamlined processes through efficient change propagation and enhanced reuse.

Figure 4:
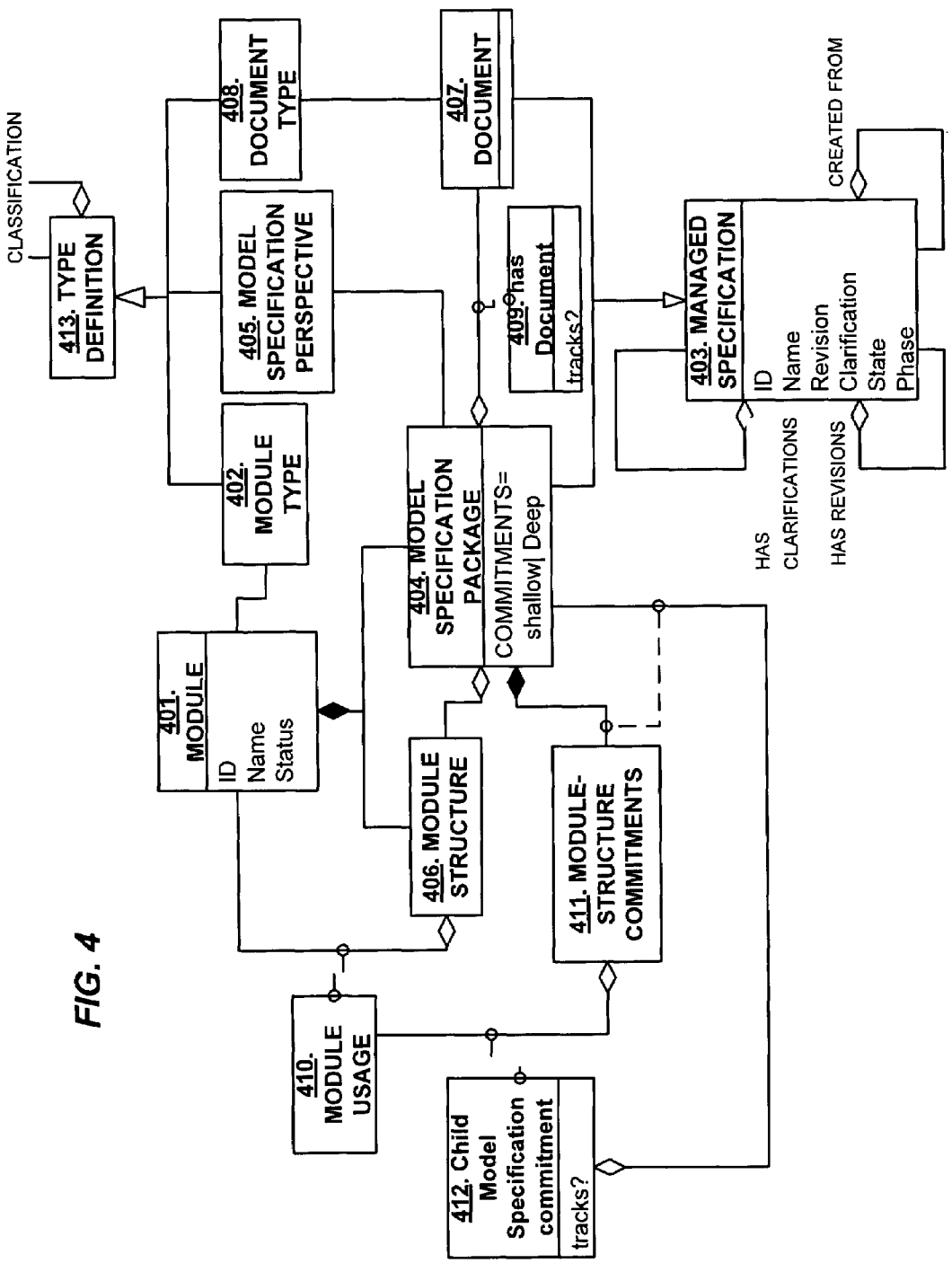
FIG. 4 is a block diagram representing another exemplary application of the UML model of FIG. 1 in accordance with various aspects of the subject matter described herein.
Figure 5:
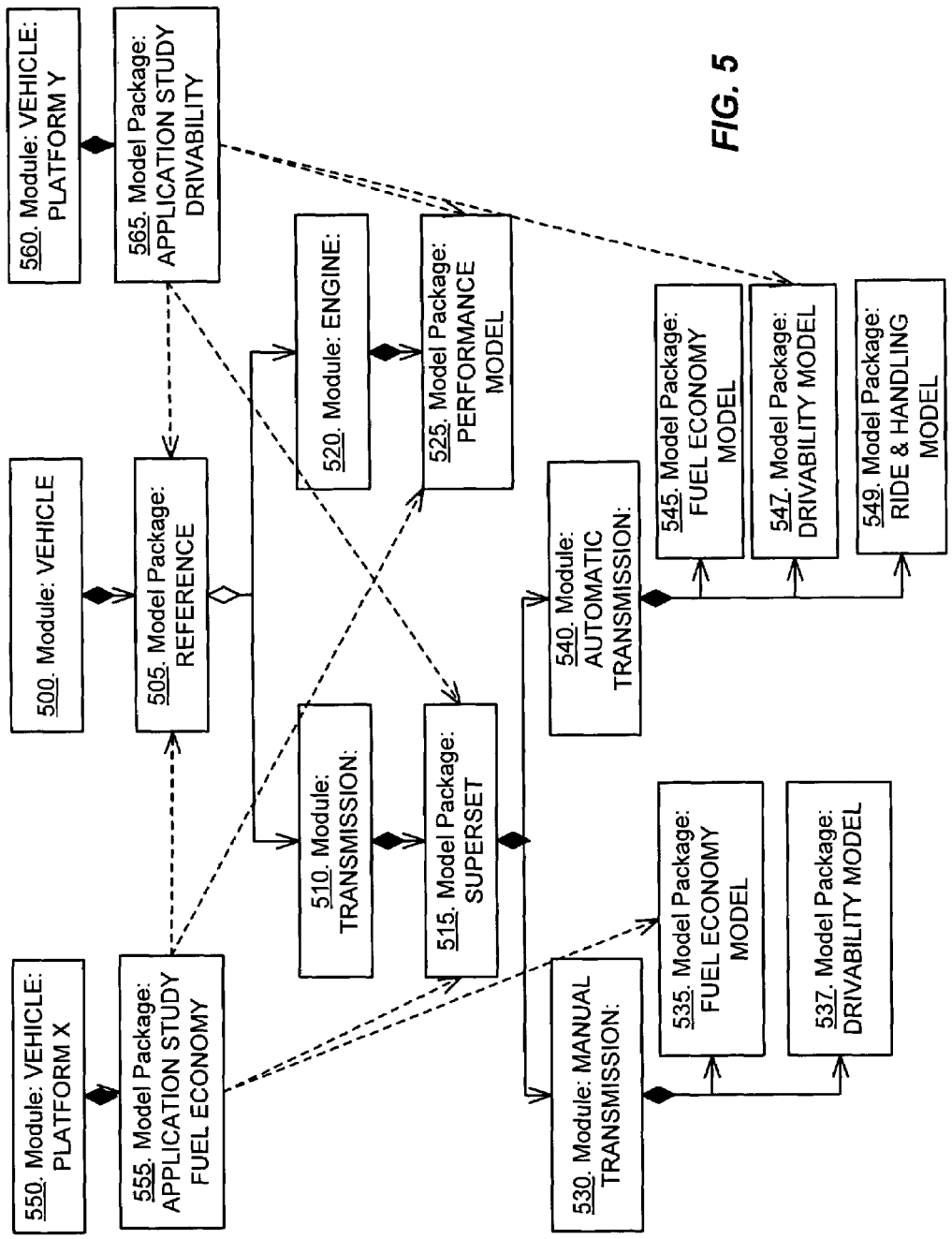
FIG. 5 is block diagram representing exemplary business objects as a specific instantiation of the class diagram shown in FIG. 4 in accordance with various aspects of the subject matter described herein.

FIG. 4 is a block diagram representing another exemplary application of the UML model of FIG. 1 in accordance with various aspects of the subject matter described herein. The application may be used to manage systems engineering hierarchies and may be applied during the early stages of product development where modular product architectures are established to promote reuse. For example, different types of modules may be established with well-defined interfaces resulting in a product architecture and may be reused for a particular application. The nomenclature in FIG. 4 introduces classes such as Module 401, Model Specification Package 404, Module Structure 406, Module Usage 410, and Module-Structure Commitments 411, Module Usage 410, Child Model Specification Commitment 412, Document 407, has Document relationship 409, Module Type 402, Model Specification Perspective 405, Document Type 408, Type Definition 413, and Managed Specification 403 and follows the model shown in FIG. 1. An instantiation of this class diagram is shown in FIG. 5, which illustrates an example that may be used in the automotive domain. In FIG. 5, a Vehicle product architecture is represented by a Vehicle module 500 and its Model Spec package 505 and associated Module structure. The Vehicle's Reference Model Spec Package 505 is composed of a Transmission 510 and Engine 520, each of which has a corresponding Model Spec Package (515, 525). The Transmission Superset Model Spec Package 515 lists valid alternatives as Module Manual Transmission 530 and Module Automatic Transmission 540. The Manual Transmission 530 has multiple Model Spec Packages (535, 537) for different simulation perspectives (e.g., Fuel Economy and Drivability model). The Automatic Transmission 540 model also has multiple Model Spec Packages (545, 547, 549) for different simulation perspectives (e.g., Fuel Economy, Drivability model, and Ride and Handling model). FIG. 5 also shows that "Module: Vehicle Platform X" 550 establishes a Model Spec Package for a Fuel Economy Application Study 555 that reuses the Vehicle Module 500 and specifically references the Engine's Performance Model Spec Package 525 and the Transmission's Superset Model Spec Package 515. Within the Transmission's Superset Model Spec Package 515, the Vehicle Platform X Fuel Economy Application Study 555 further refines its commitments (by setting commitments to deep commitments as described in conjunction with FIG. 1) and selects the Manual Transmission Module's Fuel Economy Model Spec Package 535. The Vehicle Platform Y 560 can autonomously define a Model Spec Package 565 for a Drivability Application Study that uses the Vehicle Module 500 product architecture and specifically references the Engine's Performance Model Spec Package 525 and the Transmission's Superset Model Spec Package 515. Within the Transmission's Superset Model Spec Package 515, the Vehicle Platform Y Drivability Application Study 565 further refines its commitments (by setting commitments to deep commitments) and selects the Automatic Transmission Module's Drivability Model Spec Package 547. This example illustrates the use of deep commitments to gradually define the configuration by selecting lower level Model Spec Packages for modules that are within a previous module structure commitment's decomposition.

FIG. 6 is a block diagram representing another exemplary application of the UML model of FIG. 1 in accordance with various aspects of the subject matter described herein. In FIG. 6 the allocation of function to behavior within a product architecture is illustrated. In this model, three types of Items are recognized: Function 620, 640, Module 660, and Module-Function Cross-Reference 600. The Module-Function Cross-Reference Specification 610 has an autonomous process and captures dependencies between the Module P's Model Specification Package Model P1 670 and the specific function that this Module implements, namely Function X 620's Function Specification Package Model X1 630 and Function Y 640's Function Specification Package Model Y1 650. Consequently, it is possible to manage and track dependencies between Functions and Modules. Additionally, there is a clear basis for understanding the Module P 660's basis for existence (to implement Function X 620 and Function Y 640). Each of these Specification Packages 610, 630, 650, 670 can evolve autonomously; however, there is visibility of dependencies so that processes can execute accurately based on this knowledge. The Item Structure associated with the Item Specification serves as an important cross-referencing mechanism whereby Items referenced by one Item Specification may be allocated to Items referenced by another Item Specification. Such cross-referencing provides useful consistency, integrity and completeness of the architecture whether it relates Item Specifications within the same Item or Item Specifications across different Items. An example of the former case (Part Specifications within the same Part) is the case of engineering and manufacturing bill of material reconciliation for the same part or assembly following a restructuring of the engineering bill of materials into a manufacturing bill of materials to meet manufacturing process needs. An example of the latter case (Item Specifications across different Items) has been discussed above in conjunction with FIG. 6. These examples illustrate how the subject matter described herein allows multiple representations to autonomously co-exist under a unified structure and also provides a degree of traceability and accountability in product definition and elaboration through the product lifecycle.

Figure 7:
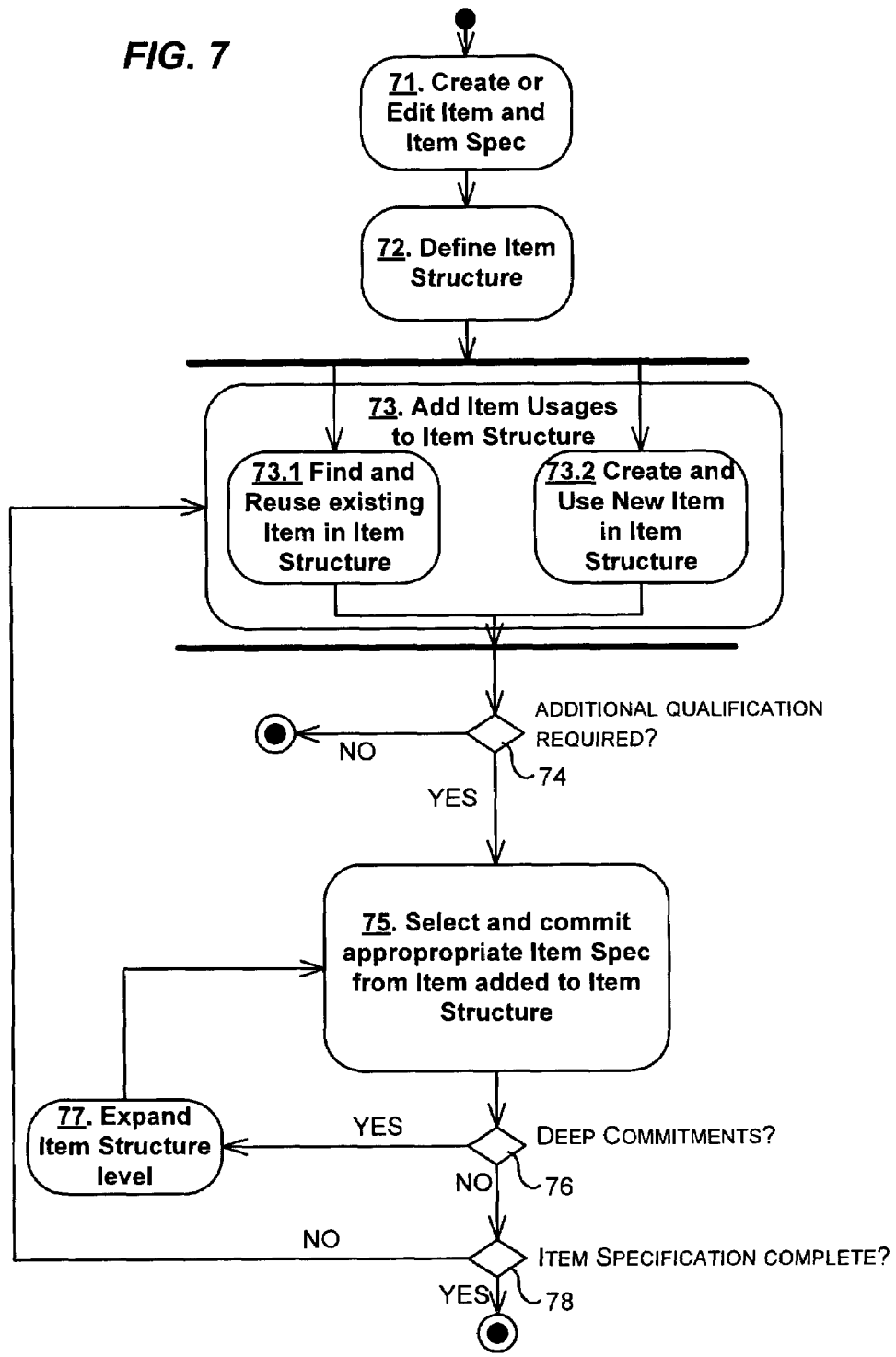
FIG. 7 is a UML activity diagram in accordance with various aspects of the subject matter described herein.

FIG. 7 is a UML activity diagram in accordance with various aspects of the subject matter described herein. At block 71, the user creates or edits an item (e.g., Item 1 of FIG. 1) and assigns its item type (e.g., item type 2 of FIG. 1) and also creates or edits an item specification (e.g., item spec 4 of FIG. 1). The item specification is uniquely identified within the context of an item and is qualified by an item perspective (e.g., item perspective 5 of FIG. 1), which defines its usage applicability (e.g., engineering, manufacturing, procurement, marketing options, and the like) and the level of child part specification commitments permitted (e.g., shallow or deep). The user defines the item specification by populating the corresponding attributes and adds documents along with an applicability policy (e.g., documents 7 and document relationship 9 of FIG. 1).

At block 72, the user defines the item structure (e.g., item structure 6 of FIG. 1). At block 73, the user adds one or more items to the item structure resulting in new item usages (e.g., item usages 10 of FIG. 1). This is done as follows:

73.1: Existing items within the system are reused in defining the item structure; and/or

73.2: New items are defined and used in the item structure

At block 74, if no additional items specification qualification is required, then the specification is complete. An example of this includes the use of an item that has no item specification such as standard components that typically reference supplier catalogues. If additional qualification is needed, the user proceeds to block 75.

Since an item may contain multiple item specifications of different identity, perspective, and revisions, in block 75 the user is presented with a list of existing items specifications for each selected item in the items structure based on which the corresponding item specification is selected and committed to the item-structure's commitments (e.g., item-structure commitments 11 and child item specification commitment 12 of FIG. 1). The following identification is made for each child item specification commitment (e.g., child item specification commitment 12 of FIG. 1): the child item specification ID, revision, and its applicability policy (e.g., child item specification commitment 12 of FIG. 1). An example of an applicability policy may include a particular item specification revision or a rule to resolve to the latest effective item specification for that item's specification ID. This is done for each defined item usage within the item structure.

If the item specification commitments are set to deep 76, the user is recursively presented with the option to select item specification commitments for lower level items within the item structure by expanding the item structure level 77, based on the hierarchical commitments already made. Otherwise the item specification process is complete.

At block 78, if the item specification is complete, the process completes; otherwise, additional item usages are needed, and the user repeats the process starting at block 73.

This process may be used to define a new item configuration or to change an existing item definition.

Users accessing the item specification have direct access to the precise and complete information associated with the item specification, which may include:

The item and item type;

The item perspective;

The related documents, based on the applicability policy (e.g., document relationship 9 of FIG. 1);

the item structure;

the item-structure commitments; and recursively, all items an item specifications is related to through the item usage relationship, the item-structure commitments, and the child item specification commitment based on the applicability policy (e.g., child item specification commitment 12 of FIG. 1).

Aspects of the subject matter described herein unify representations aligned with different perspectives under a common item definition and facilitate reuse of existing items, item specs, and item structure. Process autonomy is enabled allowing each perspective to manage and control its item spec based on its specific processes and practices, with awareness of dependencies between different perspective's item specs, while retaining traceability changes.

As can be seen from the foregoing detailed description, there is provided aspects for defining, sharing, unifying and managing multiple representations of product definition in the context of business activities. While the subject matter described herein is susceptible to various modifications and alternative constructions, certain illustrated embodiments thereof are shown in the drawings and have been described above in detail. It should be understood, however, that there is no intention to limit the claimed subject matter to the specific aspects described herein, but on the contrary, the intention is to cover all modifications, alternative constructions, and equivalents falling within the spirit and scope of the subject matter described herein.

The methods described herein may be implemented by a computer executing instructions stored tangibly in a tangible computer-readable medium (where the computer-readable medium does not include computer-readable mediums that are intangible, such as "signals.")

What is claimed is:

1. At least one tangible computer-readable medium having a plurality of computer-readable data structures stored thereon, comprising:
   a plurality of items included on the at least one tangible computer-readable medium, the plurality of items representing a plurality of co-existing perspective structures of items relating to product information, each item included on the at least one computer-readable medium comprised of one or more computer-readable item structures that define subitems of the item; the item representing product information, a set of item specifications corresponding to the subitems, wherein zero or more item specifications exist which correspond to each subitem, wherein each perspective structure corresponds to a particular one of a plurality of co-existing perspectives and each perspective is indicative of process and practices to, during the lifecycle of a product to which the product information pertains, control the items of the perspective structure corresponding to that perspective; and
   a set of commitment structures included on the at least one computer-readable medium, wherein each commitment structure associates, for the context of the perspective in which an item exists, each subitem for two or more item specifications with one of the two or more item specifications,
   such that when the item is processed by a computer, any item specification associated with a subitem by a commitment structure is determinable from the commitment structure.

2. The at least one computer-readable medium of claim 1, wherein the items are classified by a plurality of data structures, tangibly embodied on the at least one computer-readable medium, each data structure that encodes a hierarchy representing a perspective structure of items relating to the product information.

3. The at least one computer-readable medium of claim 1, wherein an item specification is related to a document based on an applicability policy that indicates that a specific revision or latest revision of the document is used in context of the item specification.

4. The at least one computer-readable medium of claim 1, wherein each of the subitems are comprised of zero or more computer-readable item structures tangibly embodied in the computer-readable medium that define subitems of the subitems, wherein the set of item specifications further corresponds to the subitems of the subitems, wherein zero or more item specifications exist which correspond to each subitem of the subitems, and wherein the set of commitment structures further associates each subitem of the subitems for which two or more item specifications exist with one of the two or more item specifications.

5. The at least one computer-readable medium of claim 1 wherein the item represents a part, each item specification represents a part specification, and each subitem represents a component of the part.

6. The at least one computer-readable medium of claim 1, wherein the item represents a module, each item specification represents a model specification package, and each subitem represents a submodule of the module.

7. The at least one computer-readable medium of claim 1, wherein the set of commitment structures represents [a motivation/reason/description/rationale for] how items in one item specification are derived from items in another item specification by storing relationships between the item specifications.

8. In a computing environment, a method of manipulating at least one tangible computer-readable medium, comprising:
   maintaining a plurality of items included on the at least one tangible computer-readable medium, the plurality of items representing a plurality of co-existing perspective structures of items relating to product information, wherein each perspective structure corresponds to a particular one of a plurality of co-existing perspectives and each perspective is indicative of process and practices to, during the lifecycle of a product to which the product information pertains, control the items of the perspective structure corresponding to that perspective;
   editing a first one of the items tangibly embodied on the at least one computer-readable medium that includes an item specification and an item structure; finding a second one of the items that already exists as being tangibly embodied on the at least one computer-readable medium, wherein the second item is a component of the first item, and wherein the first item and the second item represent product information;
   adding a reference to the second item to the item structure;
   determining whether additional qualification is needed to unambiguously specify the second item in context of the first item; and
   if the second item is associated with one or more specifications, selecting one of the one or more specifications for the context of the perspective in which the second item exists to commit to such that the second item is unambiguously specified in the context of the first item, wherein committing to the one of the one or more specifications includes establishing, in a computer-readable manner, that in the context of the perspective in which the second item is being created, the selected one of the one or more specifications has a relationship to the first item based on an applicability policy.

9. A tangible computer-readable medium having computer-executable instructions embodied therein configured to cause a computing system to maintain a structured item configuration that accommodates item and relationship reusability and multiple co-existing specification perspectives, including to:
   maintain, on a tangible computer-readable medium, a plurality of co-existing perspective structures of items relating to product information, wherein each perspective structure corresponds to a particular one of a plurality of co-existing perspectives and each perspective is indicative of processes and practices to, during the lifecycle of a product to which the product information pertains, control the items of the perspective structure corresponding to that perspective;
   create a second item, on a tangible computer-readable medium and in the context of one of the plurality of co-existing perspectives, including creating a computer-readable item structure for the second item that references a first item in the structure for that one perspective;
   determine whether the first item includes multiple item specifications; and
   if the first item includes multiple item specifications, commit in the computer-readable item structure for the context of the perspective in which the second item is being created to one of the multiple item specifications of the first item, wherein committing in the computer-readable item structure to the one of the multiple item specifications of the first item includes establishing, in a computer-readable manner, that in the context of the perspective in which the second item is being created, the second item has a relationship to the one of the multiple item specifications of the first item based on an applicability policy.

10. The computer-readable medium of claim 9, wherein the product information includes a process associated with a product.

11. The computer-readable medium of claim 9, wherein the first item and the second item are classified by an item type that is part of a hierarchical classification system.

12. The computer-readable medium of claim 9, wherein the item specification is classified by a perspective that comprises one or more of marketing, sales, accounting, management, maintenance, design, manufacturing, engineering, research, procurement, quality, and analysis.

13. The computer-readable medium of claim 9, wherein establishing, in a computer-readable manner, that the second item has a relationship to the one of the multiple item specifications of the first item based on an applicability policy includes updating a data structure to indicate the relationship and the applicability policy.

14. The computer-readable medium of claim 13, wherein the applicability policy indicates that a latest revision of the one of the multiple item specifications is used in context of the item.

15. The computer-readable medium of claim 13, wherein the applicability policy indicates that a specified revision of the one of the multiple item specifications is used in context of the item.

16. The computer-readable medium of claim 9, wherein the first item exists in the computer-readable item structure previous to creating the second item and wherein adding a second item to the item structure, comprising reusing the first item.

17. The computer-readable medium of claim 9, further comprising creating the second item in the computer-readable item structure prior to adding it to the item structure.

18. The computer-readable medium of claim 9, wherein committing to one of the multiple item specifications of the first item comprises committing, by establishing in a computer-readable manner, to an item specification from the first item or from items that comprise the first item.

19. The computer-readable medium of claim 9, further comprising creating, in a computer-readable manner, a traceability relationship between items to indicate that one item is derived from another item.

* * * * *

UNITED STATES PATENT AND TRADEMARK OFFICE
CERTIFICATE OF CORRECTION

PATENT NO. : 7,617,014 B1  Page 1 of 1
APPLICATION NO. : 11/142164
DATED : November 10, 2009
INVENTOR(S) : Rangan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 462 days.

Signed and Sealed this

Nineteenth Day of October, 2010

David J. Kappos
*Director of the United States Patent and Trademark Office*